(12) United States Patent
Sakuma et al.

(10) Patent No.: US 10,794,250 B2
(45) Date of Patent: Oct. 6, 2020

(54) ELECTROCHEMICAL REACTOR AND INTERNAL COMBUSTION ENGINE PROVIDED WITH ELECTROCHEMICAL REACTOR

(71) Applicant: TOYOTA JIDOSHA KABUSHIKI KAISHA, Toyota-shi (JP)

(72) Inventors: Tetsuya Sakuma, Gotemba (JP); Keishi Takada, Ashigarakami-gun (JP); Hiromasa Nishioka, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/215,705

(22) Filed: Dec. 11, 2018

(65) Prior Publication Data

US 2019/0195105 A1    Jun. 27, 2019

(30) Foreign Application Priority Data

Dec. 26, 2017    (JP) .................................. 2017-249769

(51) Int. Cl.
*F01N 3/08* (2006.01)
*B01D 53/32* (2006.01)
(Continued)

(52) U.S. Cl.
CPC ......... *F01N 3/0892* (2013.01); *B01D 53/326* (2013.01); *B01D 53/56* (2013.01); *B01D 53/92* (2013.01); *B01D 53/9431* (2013.01); *B01D 53/9495* (2013.01); *F01N 9/00* (2013.01); *B01D 53/9445* (2013.01); *B01D 2255/806* (2013.01); *B01D 2257/404* (2013.01); *B01D 2258/012* (2013.01); *F01N 2240/34* (2013.01); *F01N 2900/08* (2013.01)

(58) Field of Classification Search
CPC ...... B01D 53/326; B01D 53/56; B01D 53/92; B01D 53/9431; B01D 53/9495; B01D 2255/806; B01D 2257/404; B01D 2258/012; B01D 53/9445; F01N 3/0892; F01N 9/00; F01N 2240/34; F01N 2570/14; F01N 2900/08
See application file for complete search history.

(56) References Cited

U.S. PATENT DOCUMENTS 5,352,337 A    10/1994    Kobayashi et al.
6,168,705 B1    1/2001    Molter et al.
(Continued)

FOREIGN PATENT DOCUMENTS

DE    3644090 A1    7/1988
JP    2006-346624    12/2006
JP    2009-150299 A    7/2009

*Primary Examiner* — Brandon D Lee
(74) *Attorney, Agent, or Firm* — Oblon, McClelland, Maier & Neustadt, L.L.P.

(57) ABSTRACT

An electrochemical reactor 70 is provided with a proton conductive solid electrolyte layer 75; an anode layer 76 arranged on the surface of the solid electrolyte layer and able to hold water molecules; a cathode layer 77 arranged on the surface of the solid electrolyte layer; and a current control device 73 controlling a current flowing through the anode layer and the cathode layer. The current control device reduces the current flowing through the anode layer and the cathode layer, when the water molecules held in the anode layer become smaller in amount.

7 Claims, 6 Drawing Sheets

(51) Int. Cl.
B01D 53/94 (2006.01)
F01N 9/00 (2006.01)
B01D 53/56 (2006.01)
B01D 53/92 (2006.01)

(56) References Cited

U.S. PATENT DOCUMENTS

| | | | |
|---|---|---|---|
| 2004/0009388 A1* | 1/2004 | Faguy | H01M 4/923 |
| | | | 429/430 |
| 2005/0040041 A1* | 2/2005 | Sakayanagi | G01N 27/419 |
| | | | 204/427 |
| 2009/0173623 A1* | 7/2009 | Kato | F01N 3/01 |
| | | | 204/270 |

* cited by examiner

ELECTROCHEMICAL REACTOR AND INTERNAL COMBUSTION ENGINE PROVIDED WITH ELECTROCHEMICAL REACTOR

FIELD

The present invention relates to an electrochemical reactor and an internal combustion engine provided with an electrochemical reactor.

BACKGROUND

Known in the past has been an electrochemical reactor provided with a proton conductive solid electrolyte layer, an anode layer arranged on a surface of the solid electrolyte layer, and a cathode layer arranged on a surface of the solid electrolyte layer (for example, Japanese Unexamined Patent Publication No. 2006-346624). In such an electrochemical reactor, if electric current flows through the anode layer and the cathode layer, water molecules are broken down on the anode layer whereby protons and oxygen are generated, and the $NO_X$ reacts with the protons on the cathode layer whereby nitrogen and water molecules are generated. As a result, the electrochemical reactor can be used to remove $NO_X$.

SUMMARY

Technical Problem

In the above-mentioned electrochemical reactor, since water molecules are necessary to remove $NO_X$, it may be considered to form the anode layer by a material able to hold water molecules. In an electrochemical reactor configured as above, the water molecules held at the anode layer are broken down to produce protons.

In this regard, if placing an electrochemical reactor configured as above, for example, in an exhaust passage of an internal combustion engine, the concentration of water molecules in the exhaust gas flowing around the electrochemical reactor (concentration of liquid water and steam) will not be constant, but will change according to the operating state of the internal combustion engine. Therefore, depending on the operating state of the internal combustion engine, the concentration of water molecules in the exhaust gas will become lower and accordingly the water molecules supplied to the anode layer will decrease. If in such a state electrical current flows through the anode layer and the cathode layer to continue to break down the water molecules on the anode layer, the amount of water molecules held at the anode layer will decrease.

On the other hand, if the current flowing through the anode layer and the cathode layer is large, a large amount of protons move from the anode layer to the cathode layer. As a result, part of the protons are released into the exhaust gas as hydrogen molecules, without contributing to removal of $NO_X$. Therefore, if increasing the current regardless of the decrease of the amount of water molecules held at the anode layer, a large amount of protons not contributing to removal of $NO_X$ are generated and a decrease in the amount of the water molecules held at the anode layer is promoted.

Further, finally, the amount of water molecules held at the anode layer becomes small and the amount of protons moving from the anode layer to the cathode layer decreases. As a result, at the cathode layer, the amount of $NO_X$ reduced and removed decreases. Therefore, the performance of the electrochemical reactor in removing $NO_X$ decreases.

The present invention was made in consideration of the above technical problem and has as its object to cause a decrease in the protons not contributing to the removal of $NO_X$ in the electrochemical reactor to thereby suppress the decrease in performance in removing $NO_X$ along with a decrease in the amount of water molecules held at the anode layer.

Solution to Problem

The present invention was made so as to solve the above problem and has as its gist the following.

(1) An electrochemical reactor comprising: a proton conductive solid electrolyte layer; an anode layer arranged on the surface of the solid electrolyte layer and able to hold water molecules; a cathode layer arranged on the surface of the solid electrolyte layer; and a current control device controlling a current flowing through the anode layer and the cathode layer, wherein the current control device is configured to reduce the current flowing through the anode layer and the cathode layer, when the water molecules held in the anode layer become smaller in amount.

(2) An internal combustion engine in which the electrochemical reactor according to above (1) is provided in an exhaust passage, wherein the electrochemical reactor is arranged in the exhaust passage so that both of the anode layer and the cathode layer are exposed to exhaust gas.

(3) The internal combustion engine according to above (2), wherein the internal combustion engine is configured to perform fuel cut control stopping the supply of fuel to the internal combustion engine during operation of the internal combustion engine, and the current control device is configured to reduce the current, deeming that the water molecules held at the anode layer become smaller in amount, when the fuel cut control is started.

(4) The internal combustion engine according to above (2) or (3), wherein the internal combustion engine is configured to enable change of the air-fuel ratio of the air-fuel mixture supplied to the internal combustion engine, and the current control device is configured to reduce the current, deeming that the water molecules held at the anode layer become smaller in amount, when the air-fuel ratio of the air-fuel mixture changes to a lean side.

Advantageous Effects of Invention

According to the present invention, by decreasing the protons not contributing to the removal of $NO_X$ in the electrochemical reactor, it is possible to suppress the decrease in the performance in removal of $NO_X$ along with a decrease in the amount of water molecules held at the anode layer.

DESCRIPTION OF EMBODIMENT

Figure 1:
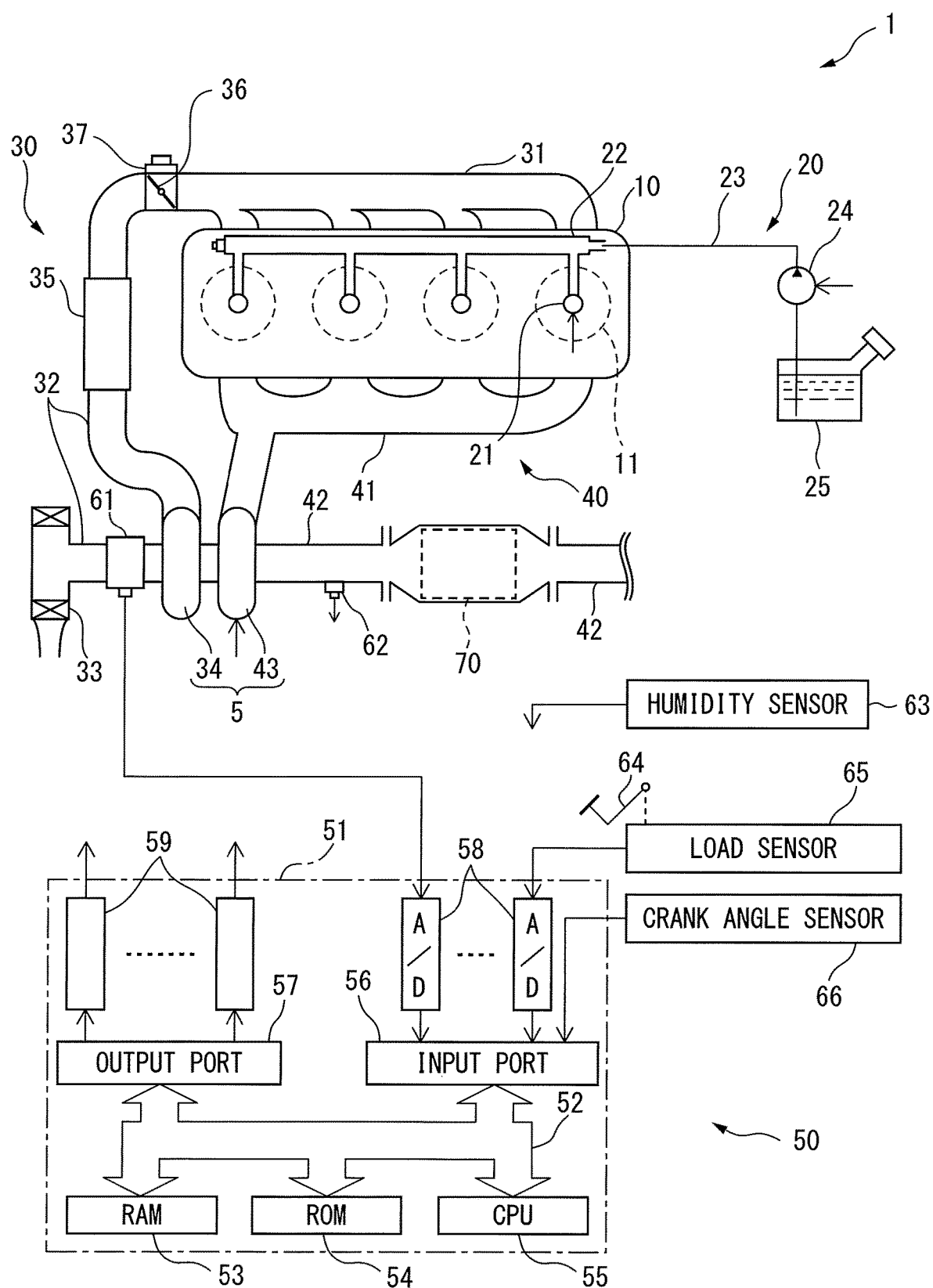
FIG. 1 is a schematic view of the configuration of an internal combustion engine.

Below, referring to the drawings, embodiments of the present invention will be explained in detail. Note that, in the following explanation, similar component elements are assigned the same reference numerals.

Explanation of Internal Combustion Engine as a Whole

First, referring to FIG. 1, the configuration of an internal combustion engine 1 according to one embodiment will be explained. FIG. 1 is a schematic view of the configuration of the internal combustion engine 1. As shown in FIG. 1, the internal combustion engine 1 is provided with an engine body 10, fuel feed system 20, intake system 30, exhaust system 40 and control device 50.

The engine body 10 is provided with a cylinder block in which a plurality of cylinders 11 are formed, a cylinder head and a crank case. A piston 14 is arranged in each cylinder 11, and each cylinder 11 is connected to intake ports and exhaust port.

The fuel feed system 20 is provided with fuel injectors 21, a delivery pipe 22, fuel feed pipe 23, fuel pump 24, and fuel tank 25. Each fuel injector 31 is arranged in the cylinder head so as to directly inject fuel into each cylinder 11. The fuel pumped out by the fuel pump 24 is supplied through the fuel feed pipe 23 to the delivery pipe 22, and then is injected from the fuel injector 21 into the cylinder 11.

The intake system 30 is provided with an intake manifold 31, intake pipe 32, air cleaner 33, compressor 34 of a turbocharger 5, intercooler 35, and throttle valve 36. The intake port of each cylinder 11 is communicated through the intake manifold 31 and the intake pipe 32 with the air cleaner 33. The intake pipe 43 is provided with the compressor 34 of the exhaust turbocharger 5 for compressing and discharging intake air flowing through the intake pipe 32, and the intercooler 35 for cooling the air compressed by the compressor 34. The throttle valve 36 is driven so as to be opened and closed, by a throttle valve drive actuator 37.

The exhaust system 40 is provided with an exhaust manifold 41, exhaust pipe 42, turbine 43 of the exhaust turbocharger 5, and electrochemical reactor 70. The exhaust port of each cylinder 11 is communicated through the exhaust manifold 51 and the exhaust pipe 52 with the electrochemical reactor 70. In the exhaust pipe 42, the turbine 43 of the exhaust turbocharger 5, which is driven to rotate by the energy of the exhaust gas, is provided. Note that the exhaust system 40 may be provided with a catalyst, such as a three-way catalyst or $NO_X$ storage reduction catalyst, upstream side or downstream side of the electrochemical reactor 70 in the flow direction of the exhaust gas.

The control device 50 is provided with an electronic control unit (ECU) 51 and various types of sensors. The ECU 51 is comprised of a digital computer, and is provided with components connected with each other through a bidirectional bus 52, such as a RAM (random access memory) 53, ROM (read only memory) 54, CPU (microprocessor) 55, input port 56, and output port 57.

At the intake pipe 32, a flow rate sensor (air-flow meter) 61 is provided for detecting the flow rate of air flowing through the intake pipe 32. At the exhaust pipe 42 (or at the exhaust manifold 41), air-fuel ratio sensor is provided for detecting the air-fuel ratio of the exhaust gas flowing into the electrochemical reactor 70. Further, the vehicle including the intake pipe 32 or the internal combustion engine 1 is provided with a humidity sensor 63 for detecting humidity of the air supplied to each cylinder 11 (or outer air). The outputs of these flow rate sensor 61, air-fuel ratio sensor 62, and humidity sensor 63 are connected through corresponding AD converters 58 to the input port 56.

Further, a load sensor 65 generating an output voltage proportional to the amount of depression of an accelerator pedal 64 is connected to the accelerator pedal 64. The output voltage of the load sensor 65 is input through a corresponding AD converter 58 to the input port 56. A crank angle sensor 66 generates an output pulse every time the crankshaft of the engine body 10 rotates by for example 10 degrees. This output pulse is input to the input port 56. At the CPU 55, the engine speed is calculated from the output pulse.

On the other hand, the output port 57 of the ECU 51 is connected through corresponding driver circuits 59 to the actuators controlling the operation of the internal combustion engine 1. In the example shown in FIG. 1, the output port 57 is connected to the fuel injectors 21, fuel pump 24 and throttle valve drive actuator 37. The ECU 51 outputs control signals controlling these actuators from the output port 57 to control the operation of the internal combustion engine 1.

Control of Internal Combustion Engine

The control device 50 performs injection control controlling the amount of fuel injected from each fuel injector 21 based on the engine load and engine speed, etc., input in the above manner. In injection control, basically, the higher the engine load, the more the injection amount is controlled so that the amount of fuel injected from each fuel injector 21 becomes greater during each cycle. As opposed to this, in the present embodiment, even if the engine load changes, the amount of air supplied to the cylinders 11 will not change that much. As a result, the higher the engine load, the higher the air-fuel ratio of the air-fuel mixture supplied into the cylinders 11.

Further, the control device 50 of the present embodiment performs fuel cut control temporarily stopping the injection of fuel from each fuel injector 21 during operation of the internal combustion engine (that is, during rotation of the crankshaft of the engine body 10), for example, when the vehicle in which the internal combustion engine 1 is mounted is decelerating. Specifically, fuel cut control is performed and the injection of fuel from each fuel injector 21 is stopped, for example, when the engine load detected by the load sensor 65 is zero, or less than or equal to a predetermined upper limit value and the engine rotational speed calculated based on the output of the crank angle sensor 66 is equal to or greater than a predetermined lower limit value (for example, 2000 rpm).

Note that, in the present embodiment, the engine body 10 is not provided with spark plugs, and the internal combustion engine 1 is a compression self-ignition type internal combustion engine. However, the internal combustion engine 1 may also be a spark ignition type internal combustion engine which ignites the air-fuel mixture by a spark from a spark plug. In this case, in injection control, the injection amount is controlled so that the air-fuel ratio of the air-fuel mixture supplied to the cylinders 11 is the target air-fuel ratio. The target air-fuel ratio is, for example, set so as to change near the stoichiometric air-fuel ratio in accordance with the engine operating state. Further, fuel cut control is similarly performed in a spark ignition type internal combustion engine as well.

Configuration of Electrochemical Reactor

Figure 2:
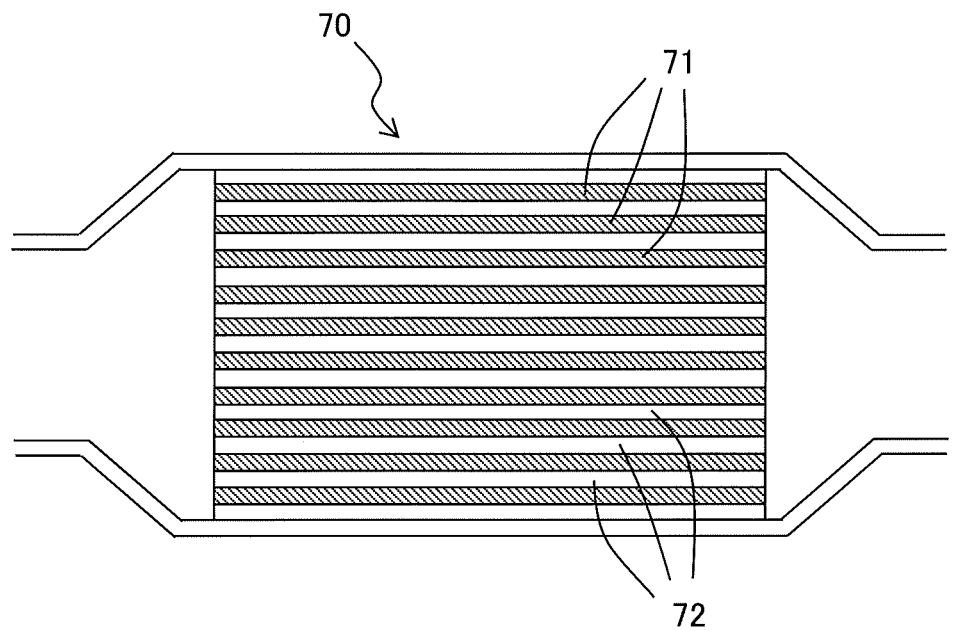
FIG. 2 is a cross-sectional side view of an electrochemical reactor.

Next, referring to FIGS. 2 and 3, the configuration of the electrochemical reactor 70 according to the present embodiment will be explained. FIG. 2 is a cross-sectional side view of the electrochemical reactor 70. As shown in FIG. 2, the electrochemical reactor 70 is provided with partition walls 71 and passages 72 defined by the partition walls. The partition walls 71 are comprised of a plurality of first partition walls extending in parallel with each other and a plurality of second partition walls extending in parallel with each other and perpendicular to the first partition walls. The passages 72 are defined by these first partition walls and second partition walls, and extend in parallel to each other. Therefore, the electrochemical reactor 70 according to the present embodiment has a honeycomb structure. The exhaust gas flowing into the electrochemical reactor 70 flows through the plurality of passages 72.

Figure 3:
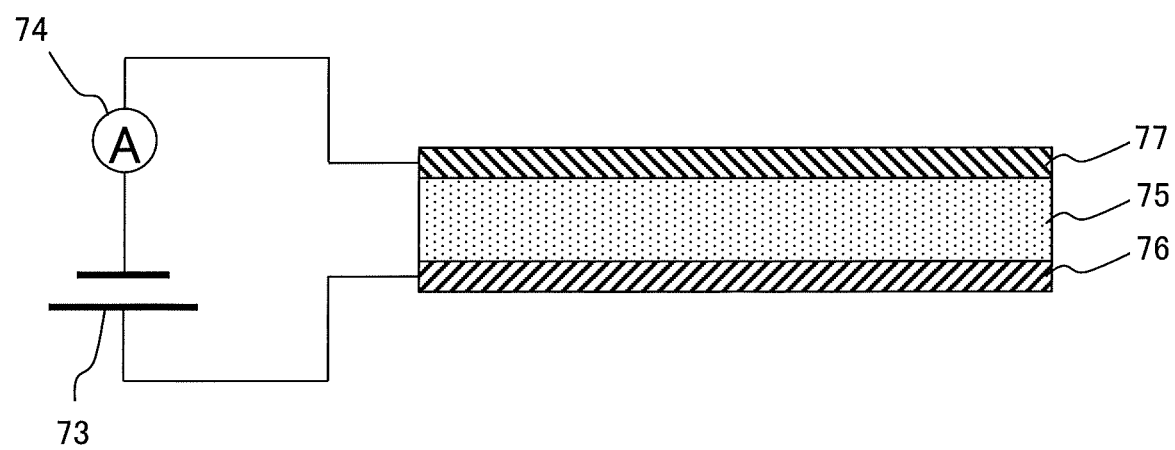
FIG. 3 is an enlarged cross-sectional view schematically showing a partition wall of the electrochemical reactor.
Figure 4:
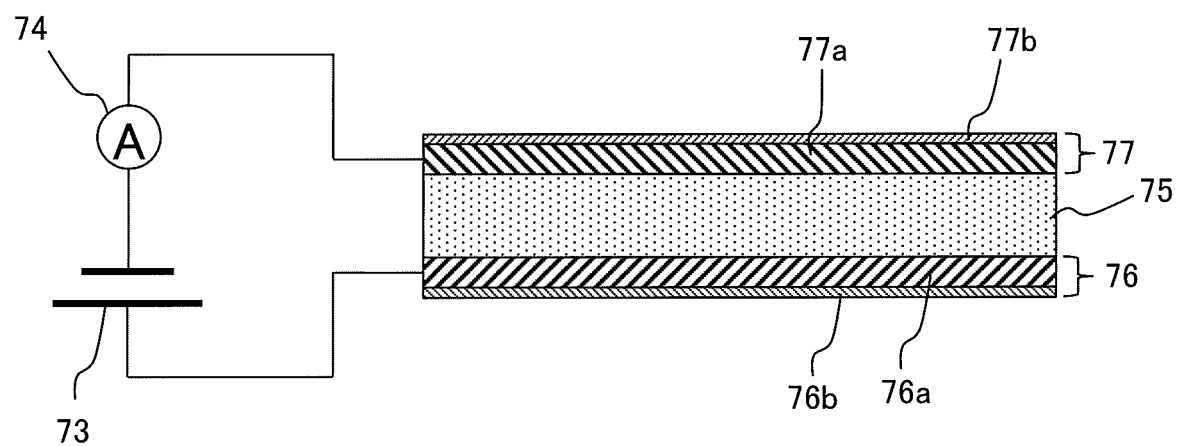
FIG. 4 is an enlarged cross-sectional view schematically showing a partition wall of the electrochemical reactor.

FIG. 3 is an enlarged cross-sectional view of a partition wall 71 of the electrochemical reactor 70. As shown in FIG. 3, a partition wall 71 of the electrochemical reactor 70 is provided with a solid electrolyte layer 75, an anode layer 76 arranged on one surface of the solid electrolyte layer 75, and a cathode layer 77 arranged on the surface of the solid electrolyte layer 75 at the opposite side to the surface at which the anode layer 76 is arranged.

The solid electrolyte layer 75 includes a porous solid electrolyte having proton conductivity. As the solid electrolyte, for example, a perovskite type metal oxide $MM'_{1-x}R_xO_{3-\alpha}$ (M=Ba, Sr, Ca, M'=Ce, Zr, R=Y, Yb, for example, $SrZr_xYb_{1-x}O_{3-\alpha}$, $SrCeO_3$, $BaCeO_3$, $CaZrO_3$, $SrZrO_3$, etc.), a phosphate (for example, $SiO_2$-$P_2O_5$-based glass, etc.), or metal doped $Sn_xIn_{1-x}P_2O_7$ (for example, $SnP_2O_7$, etc.) are used.

The anode layer 76 and the cathode layer 77 both include Pt, Pd, Rh, or other precious metals. Further, the anode layer 76 includes a substance able to hold (that is, able to adsorb and/or absorb) water molecules. Specifically, the substance able to hold water molecules includes zeolite, silica gel, activated alumina, etc. On the other hand, the cathode layer 77 includes a substance able to hold (that is, able to adsorb and/or absorb) $NO_X$. Specifically, the substance able to hold $NO_X$ includes K, Na, or another alkali metal, Ba or another alkali earth metal, La or another rare earth, etc.

Further, the electrochemical reactor 70 is provided with a power system 73 and ammeter 74. The positive electrode of the power system 73 is connected to the anode layer 76, while the negative electrode of the power system 73 is connected to the cathode layer 77. The power system 73 is configured to be able to change the current flowing through the cathode layer 77, solid electrolyte layer 75, and anode layer 76. Further, the power system 73 is configured to be able to change the voltage applied across the anode layer 76 and the cathode layer 77.

Further, the power system 73 is connected to the ammeter 74 in series. Further, the ammeter 74 is connected through a corresponding AD converter 58 to the input port 56. The power system 73 is connected through a corresponding drive circuit 59 to the output port 57 of the ECU 51. The power system 73 is controlled by the ECU 51. Therefore, the power system 73 and ECU 51 function as a current control device for controlling the current flowing through the anode layer 76 and the cathode layer 77. In particular, in the present embodiment, the power system 73 is controlled so that the current value detected by the ammeter 74 becomes a target value.

In the electrochemical reactor 70 configured as above, if current flows from the power system 73 to the anode layer 76 and the cathode layer 77, reactions such as in the following formulas occur at the anode layer 76 and the cathode layer 77:

Anode side: $2H_2O \rightarrow 4H^+ + O_2 + 4e$

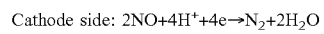

Cathode side: $2NO + 4H^+ + 4e \rightarrow N_2 + 2H_2O$

That is, in the anode layer 76, the water molecules held at the anode layer 76 are electrolyzed whereby oxygen and protons are generated. The generated oxygen is released into the exhaust gas, while the generated protons move from the anode layer 76 through the the solid electrolyte layer 75 to the cathode layer 77. In the cathode layer 77, the NO held at the cathode layer 77 reacts with the protons and electrons whereby nitrogen and water molecules are generated.

Therefore, according to the present embodiment, by making current flow from the power system 73 of the electrochemical reactor 70 to the anode layer 76 and the cathode layer 77, it is possible to reduce the NO in the exhaust gas to $N_2$ to remove it.

Note that, in the above embodiments, the anode layer 76 and the cathode layer 77 are arranged on two surfaces at the opposite sides of the solid electrolyte layer 75. However, the anode layer 76 and the cathode layer 77 may also be arranged on the same surface of the solid electrolyte layer 75. In this case, the protons move through the vicinity of the surface of the solid electrolyte layer 75 at which the anode layer 76 and the cathode layer 77 are arranged.

Further, as shown in FIG. 5, the anode layer 76 may include two layers of a conductive layer 76a including a precious metal having electroconductivity and a water molecule holding layer 76b including a substance able to hold water molecules. In this case, the conductive layer 76a is arranged on the surface of the solid electrolyte layer 75, while the water molecule holding layer 76b is arranged on the surface of the conductive layer 76a at the opposite side from the solid electrolyte layer 75 side.

Similarly, the cathode layer 77 may include two layers of a conductive layer 77a including a precious metal having electroconductivity and an $NO_X$-holding layer 77b including a substance able to hold $NO_X$. In this case, the conductive layer 77a is arranged on the surface of the solid electrolyte layer 75, while the $NO_X$-holding layer 77b is arranged on the surface of the conductive layer 77a at the opposite side from the solid electrolyte layer 75 side.

Properties of Electrochemical Reactor

Figure 5A:
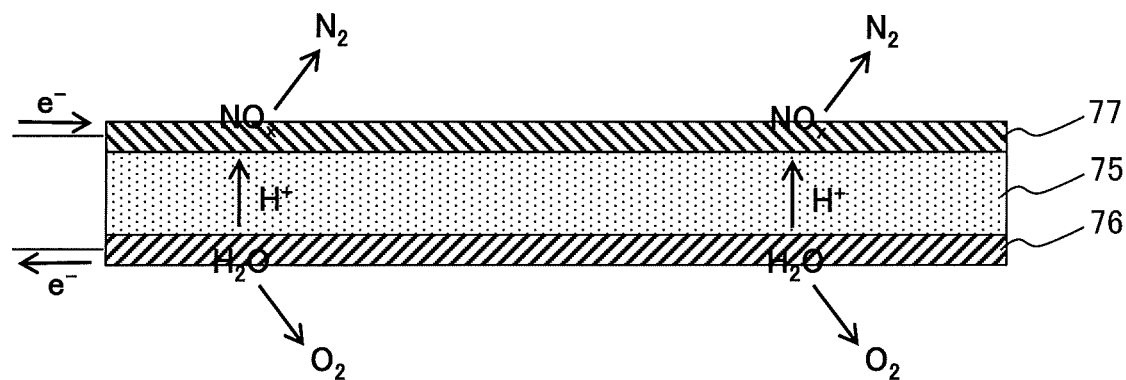
FIGS. 5A and 5B are views schematically showing a reaction occurring around a partition wall when current flows from a power system.
Figure 5B:
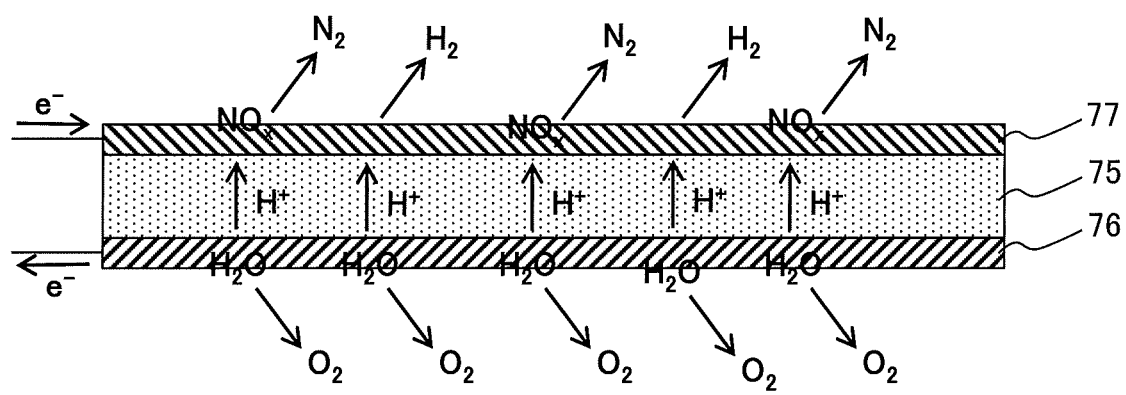

Next, referring to FIGS. 5A and 5B, the properties of the electrochemical reactor 70 configured as explained above will be simply explained. FIG. 5A is a view schematically showing the reaction which occurs around a partition wall 71, when the current flowing from the power system 73 is small. FIG. 5B is a view schematically showing the reaction which occurs around a partition wall 71, when the current flowing from the power system 73 is large.

As shown in FIG. 5A, when the current flowing from the power system 73 is small, a small amount of protons moves through from the anode layer 76 the solid electrolyte layer 75 to the cathode layer 77. Therefore, almost all of the protons moving to the cathode layer 77 react with the NO held in the cathode layer 77 whereby $N_2$ is formed.

On the other hand, as shown in FIG. 5B, when the current flowing from the power system 73 is large, a large amount of protons move from the anode layer 76 through the solid electrolyte layer 75 to the cathode layer 77. Therefore, the rate of removal of the NO at the cathode layer 77 is somewhat higher, compared with when the current flowing from the power system 73 is small, but part of the protons moving to the cathode layer 77 does not react with the NO held at the cathode layer 77 and is released into the exhaust gas as hydrogen molecules. Therefore, if the current flowing from the power system 73 is large, more than the necessary protons are generated from the water molecules held at the anode layer 76.

In this regard, the concentration of the water molecules included in the exhaust gas changes according to the engine operating state. That is, if the air-fuel mixture burns in the cylinders 11 of the engine body 10, water molecules are generated along with combustion. Therefore, if the engine operating state changes and the amount of fuel supplied from the fuel injectors 21 changes, the concentration of the water molecules included in the exhaust gas changes. Therefore, for example, when the above-mentioned fuel cut control is being performed, the exhaust gas includes almost no water molecules.

Further, when the air-fuel ratio of the air-fuel mixture supplied into the cylinders 11 is high (lean side), compared to when it is low (rich side), the ratio of the air to the supplied fuel is higher. Therefore, at this time, after the air-fuel mixture is burned in the cylinders 11, the ratio of the air to the water molecules in the exhaust gas is high, and therefore the concentration of water molecules in the exhaust gas is low. Therefore, the concentration of water molecules in the exhaust gas changes according to the air-fuel ratio of the air-fuel mixture supplied into the cylinders 11.

If the concentration of water molecules in the exhaust gas is low, the amount of water molecules held at the anode layer 76 in the equilibrium state is small. Therefore, if the concentration of water molecules in the exhaust gas decreases, the amount of water molecules held at the anode layer 76 decreases.

When the amount of water molecules held at the anode layer 76 in the equilibrium state is reduced in this way, if a large current flows from the power system 73, the amount of the water molecules held at the anode layer 76 rapidly decreases. As a result, if the amount of the water molecules held at the anode layer 76 becomes smaller, sufficient generation of protons no longer becomes possible and the performance in removing $NO_X$ decreases.

In particular, as explained referring to FIG. 5B, when the value of the current flowing from the power system 73 is large, part of the protons do not contribute to removal of $NO_X$. Therefore, if making the value of the current flowing from the power system 73 larger despite the amount of water molecules held at the anode layer 76 decreasing, a large amount of protons not contributing to removal of $NO_X$ are produced while a decrease in the amount of water molecules held at the anode layer is promoted. Therefore, if the concentration of water molecules in the exhaust gas is low, it is necessary to reduce the value of the current flowing from the power system 73 to keep excessive protons from being generated.

Control of Electrochemical Reactor

Therefore, in the present embodiment, the power system 73 makes the current flowing through the anode layer 76 and the cathode layer 77 smaller, when the water molecules held at the anode layer 76 are relatively small in number, compared to when they are relatively great in number. In particular, in the present embodiment, the power system 73 reduces the current flowing through the anode layer 76 and the cathode layer 77, as the water molecules held at the anode layer 76 become smaller in amount.

Figure 6:
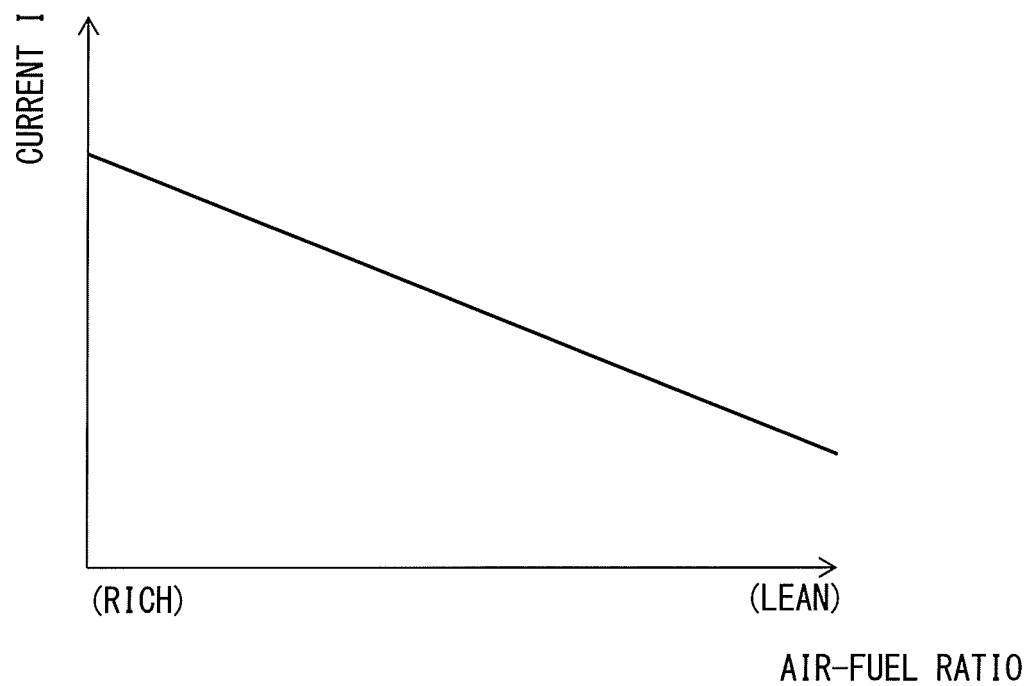
FIG. 6 is a view showing a relationship between an air-fuel ratio of an air-fuel mixture supplied into the cylinders and a current flowing through an anode layer and a cathode layer.

FIG. 6 is a view showing the relationship of the air-fuel ratio of the air-fuel mixture supplied into the cylinders 11 and the current flowing through the anode layer 76 and the cathode layer 77.

In this regard, as explained above, if the air-fuel ratio of the air-fuel mixture supplied into the cylinders 11 becomes higher (becomes the lean side), the concentration of water molecules in the exhaust gas decreases, and as a result the water molecules held at the anode layer 76 tend to decrease. Therefore, in the example shown in FIG. 6, as the air-fuel ratio of the air-fuel mixture supplied into the cylinders 11 becomes higher, that is, as the water molecules held at the anode layer 76 become fewer, the current flowing through the anode layer 76 and the cathode layer 77 is made smaller. Note that, in the example shown in FIG. 6, the current is made smaller in proportion to the air-fuel ratio of the air-fuel mixture becoming higher, but it is not necessarily required to change the current proportionally to the air-fuel ratio of the air-fuel mixture.

In addition, in the present embodiment, the power system 73 makes the current flowing through the anode layer 76 and the cathode layer 77 extremely small, when air is supplied without fuel being supplied into the cylinders 11 due to fuel cut control. Alternatively, the power system 73 makes the current flowing through the anode layer 76 and the cathode layer 77 at this time substantially zero.

Therefore, if changing the viewpoint, the power system 73 can be said to change the current flowing through the anode layer 76 and the cathode layer 77 to become smaller, when the water molecules held at the anode layer 76 change to become smaller in amount.

The time when the water molecules held at the anode layer 76 become smaller in amount, means the time when the concentration of water molecules in the exhaust gas has decreased. Further, the time when the water molecules held at the anode layer 76 become smaller in amount, includes not only the time when the water molecules held at the anode layer 76 actually change to become smaller in amount, but also the time when the water molecules held at the anode layer 76 are expected to become smaller in amount due to various actuators (fuel injectors 21, throttle valve 36, etc.) of the internal combustion engine 1 being operated. Therefore, the time when the water molecules held at the anode layer 76 become smaller in amount includes, for example, the time when the air-fuel ratio of the air-fuel mixture supplied to the cylinders 11 changes (to the lean side) to become higher or the time when fuel cut control is started.

Figure 7:
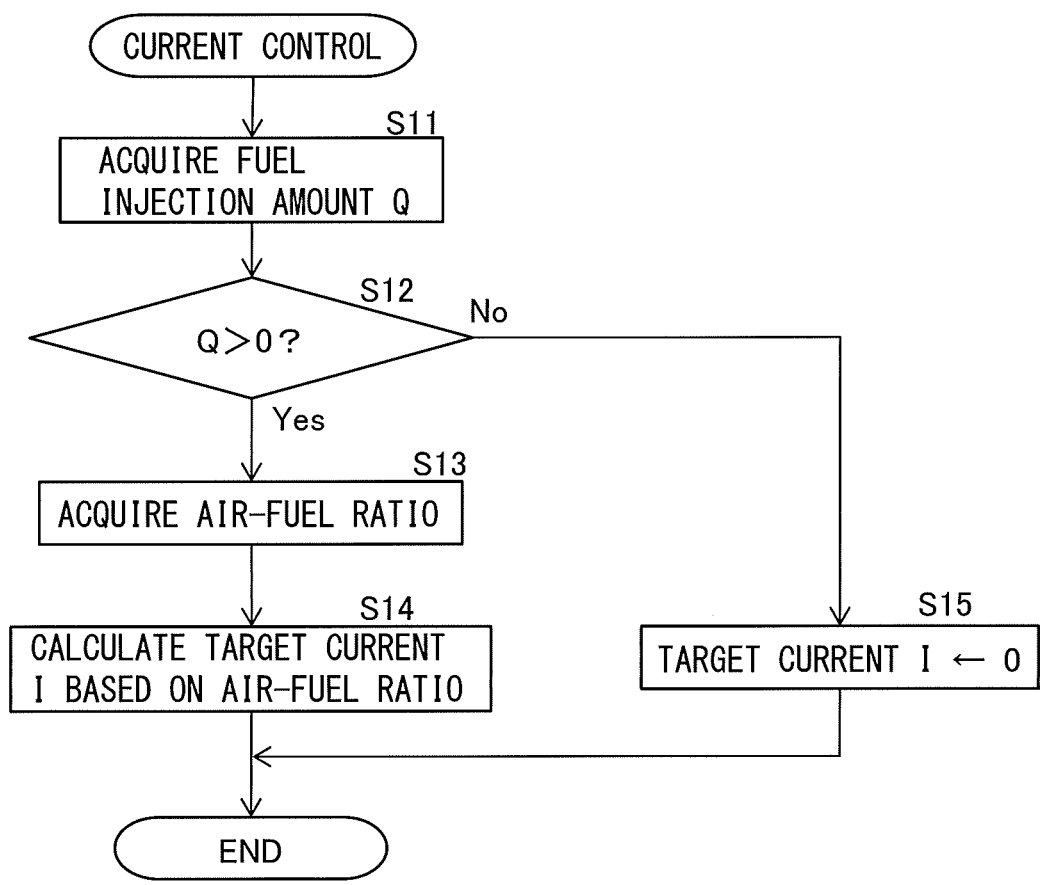
FIG. 7 is a flow chart showing a control routine of current control performed by a power system.

FIG. 7 is a flow chart showing a control routine of current control performed by the power system 73. The illustrated control routine is performed every certain time interval.

As shown in FIG. 7, first, at step S11, the amount of fuel injection Q from each fuel injector 21 to a cylinder 11 in each cycle is acquired. The amount of fuel injection Q is, for example, calculated based on the target amount of fuel injection from each fuel injector 21 calculated at the ECU 51. Each fuel injector 21 is controlled so that the amount of fuel injection from the fuel injector 21 at each cycle becomes the target amount of fuel injection.

Next, at step S12, it is judged if the amount of fuel injection Q to each cylinder 11 acquired at step S11 is greater than 0. If, at step S12, it is judged that the amount of fuel injection Q to each cylinder 11 is greater than 0, that is, if it is judged that fuel cut control is not underway, the routine proceeds to step S13.

At step S13, using the air-fuel ratio sensor 62, the air-fuel ratio of the exhaust gas flowing into the electrochemical reactor 70 is acquired. Next, at step S14, the target current value I is calculated using a map such as shown in FIG. 6, based on the air-fuel ratio of the exhaust gas acquired at step S13. The power system 73 is controlled so that the current flowing through the anode layer 76 and the cathode layer 77 becomes the target current value I, then the control routine is ended.

On the other hand, if it is judged at step S12 that the amount of fuel injection Q to each cylinder 11 is 0, that is, if it is judged that a fuel cut is underway, the routine proceeds to step S15. At step S15, the target current value I is set to zero. Therefore, the power system 73 is controlled so as not to make electrical current flow through the anode layer 76 and the cathode layer 77, then the control routine is ended.

Action and Effects

In the internal combustion engine 1 according to the present embodiment, when the concentration of water molecules in the exhaust gas is low, that is, when the water molecules held at the anode layer 76 are relatively small in number, the current flowing through the anode layer 76 and the cathode layer 77 is made smaller. Due to this, it is suppressed to generate excessive protons, it can be suppressed to decrease the amount of the water molecules held at the anode layer 76, and decrease in the $NO_X$ removal performance accompanying a decrease in the amount of the water molecules held at the anode layer 76, can be suppressed.

On the other hand, in the present embodiment, when the air-fuel mixture is burned in the cylinders 11 and water molecules are contained in the exhaust gas, current flows through the anode layer 76 and the cathode layer 77 though the current is somewhat small. Therefore, at this time, protons are generated at the anode layer 76, and therefore it is possible to maintain the removal of $NO_X$ held at the cathode layer 77.

In this regard, the reaction speed "v" in the reaction of $NO_X$ and the protons held in the cathode layer 77 is expressed by the following formula (1):

$$v = A\exp\left(-\frac{\Delta E}{RT}\right)[NOx]^\alpha [H^+]^\beta \quad (1)$$

In formula (1), A, α, and β are constants, ΔE indicates the activating energy, R indicates the gas constant, and T indicates the temperature. Further, $[NO_X]$ indicates the concentration of $NO_X$, while $[H^+]$ indicates the concentration of protons. As will be understood from formula (1), the reaction speed "v" in the reaction between $NO_X$ and the protons becomes faster as the concentration $[NO_X]$ of $NO_X$ becomes higher and as the concentration $[H^+]$ of protons becomes higher.

In this regard, if the air-fuel ratio of the exhaust gas is the rich air-fuel ratio, the $NO_X$ in the exhaust gas reacts with the unburned HC, CO, etc. in the exhaust gas, and therefore the concentration of the $NO_X$ in the exhaust gas is low. Therefore, in this case, the amount of $NO_X$ held at the cathode layer 77 tends to decrease. If the amount of $NO_X$ held at the cathode layer 77 decreases in this way, the concentration $[NO_X]$ of $NO_X$ in the formula (1) decreases, and therefore the reaction speed in the reaction of $NO_X$ and protons becomes slower.

As opposed to this, in the internal combustion engine 1 according to the present embodiment, the higher the air-fuel ratio of the air-fuel mixture supplied to each cylinder 11, the smaller the current flowing through the anode layer 76 and the cathode layer 77. Conversely speaking, in the internal combustion engine 1 according to the present embodiment, the lower the air-fuel ratio of the exhaust gas (the more to the rich side the air-fuel ratio), the more the amount of protons supplied to the cathode layer 77 per unit time is increased. As a result, in the cathode layer 77, the concentration $[H^+]$ of protons in the formula (1) increases. Therefore, according to the present embodiment, even when the air-fuel ratio of the exhaust gas is the rich air-fuel ratio, the reaction speed in the reaction between $NO_X$ and the protons can be maintained high.

Modifications

Next, a modification of the above embodiment will be explained. In the above embodiments, the current flowing through the anode layer 76 and the cathode layer 77 was controlled in accordance with the air-fuel ratio of the air-fuel mixture supplied into the cylinders 11 and whether or not fuel cut control is performed. However, the amount of the water molecules held at the anode layer 76 also changes according to other factors.

For example, if the temperature of the exhaust gas rises and thereby the temperature of the electrochemical reactor 70, in particular the temperature of the partition walls 71, rises, water molecules become harder to be held at the anode layer 76. Therefore, as the temperature of the electrochemical reactor 70 become higher, the amount of the water molecules held at the anode layer 76 is decreased. Therefore, the power system 73 may be controlled so that as the temperature of the electrochemical reactor 70 becomes higher, the current flowing through the anode layer 76 and the cathode layer 77 is made smaller.

Further, when the humidity of the air supplied to the cylinders 11 (that is, the humidity of the atmosphere around the vehicle mounting the internal combustion engine 1) is low, the humidity of the exhaust gas discharged from the cylinders 11 is also low. As a result, when the humidity of the air supplied to the cylinders 11 is low, the amount of the water molecules held in the anode layer 76 decreases. Therefore, the power system 73 may be controlled so as to make the current flowing through the anode layer 76 and the cathode layer 77 smaller, as the humidity detected by the humidity sensor 63 becomes lower.

In addition, in the above embodiments, the power system 73 is controlled so that the current flowing through the anode layer 76 and the cathode layer 77 is zero, during execution of fuel cut control. However, the power system 73 may also be controlled so that current slightly flows through the anode layer 76 and the cathode layer 77, even during execution of fuel cut control. During fuel cut control, the concentration of water molecules in the gas flowing into the electrochemical reactor 70 changes in accordance with the humidity of the air supplied to the cylinders 11, and therefore preferably the current flowing through the anode layer 76 and the cathode layer 77 is made smaller, as the humidity detected by the humidity sensor 63 becomes lower.

The invention claimed is:
1. An electrochemical reactor comprising:
a proton conductive solid electrolyte layer;

an anode layer arranged on a surface of the solid electrolyte layer, the anode layer configured to hold water molecules;

a cathode layer arranged on a surface of the solid electrolyte layer; and a controller controlling a current flowing through the anode layer and the cathode layer, wherein the controller is configured to determine an amount of the water molecules held within the anode, and based on the amount of the water molecules held by the anode layer, the controller is configured to reduce the current flowing through the anode layer and the cathode layer, when the water molecules held in the anode layer become smaller in amount.

2. The electrochemical reactor according to claim 1, wherein the anode layer is arranged on a surface of the solid electrolyte layer, and wherein the cathode layer arranged on a surface of the solid electrolyte layer on an opposite side of the solid electrolyte layer than the surface on which the anode is arranged.

3. The electrochemical reactor according to claim 1, wherein the controller determines the amount of the water molecules held within the anode based on an air-fuel ratio of an air-fuel mixture.

4. An internal combustion engine in which the electrochemical reactor according to claim 1 is provided in an exhaust passage, wherein the electrothemical reactor is arranged in the exhaust passage so that both of the anode layer and the cathode layer are exposed to exhaust gas.

5. The internal combustion engine according to claim 4, wherein the internal combustion engine is configured to perform fuel cut control stopping the supply of fuel to the internal combustion engine during operation of the internal combustion engine, and the controller is configured to reduce the current, deeming that the water molecules held at the anode layer become smaller in amount, when the fuel cut control is started.

6. The internal combustion engine according to claim 4, wherein the internal combustion engine is configured to enable change of an air-fuel ratio of an air-fuel mixture supplied to the internal combustion engine, and the controller is configured to reduce the current, deeming that the water molecules held at the anode layer become smaller in amount, when the air-fuel ratio of the air-fuel mixture changes to a lean side.

7. The internal combustion engine according to claim 5, wherein the internal combustion engine is configured to enable change of an air-fuel ratio of an air-fuel mixture supplied to the internal combustion engine, and the controller is configured to reduce the current, deeming that the water molecules held at the anode layer become smaller in amount, when the air-fuel ratio of the air-fuel mixture changes to a lean side.

\* \* \* \* \*